D. H. CROOK.
GRADE INDICATOR FOR VEHICLES.
APPLICATION FILED JULY 26, 1917.
1,251,756.
Patented Jan. 1, 1918.
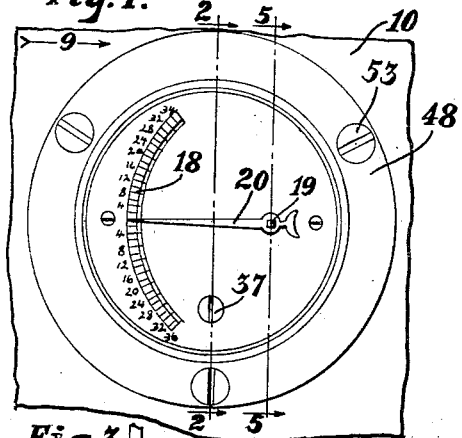
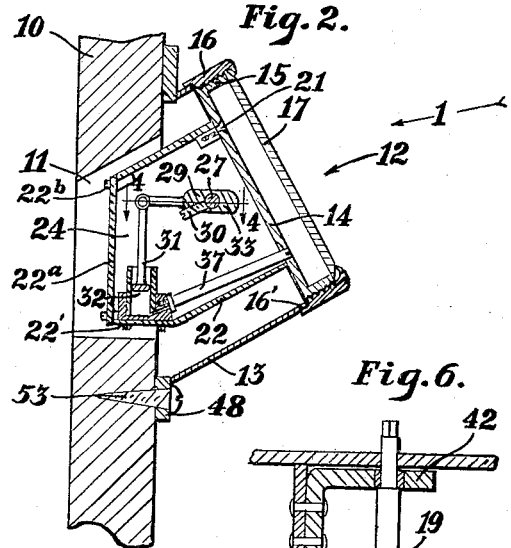
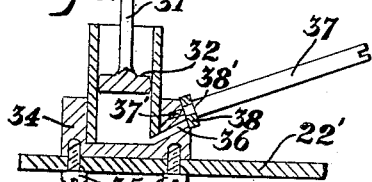
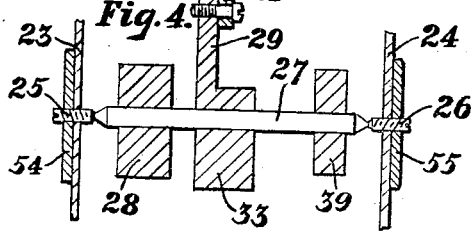
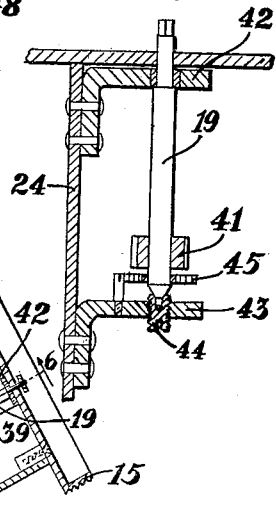
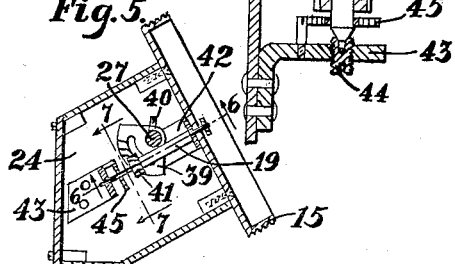
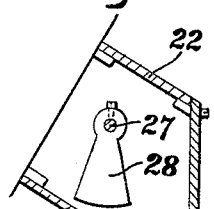
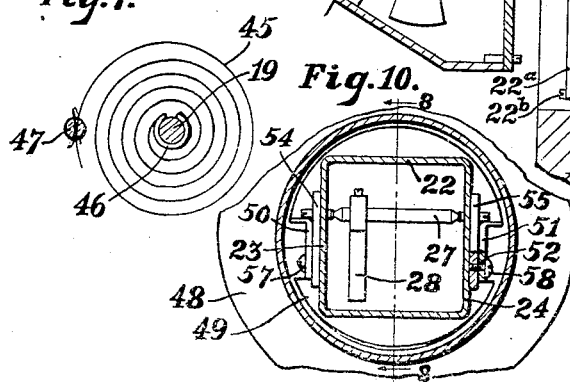
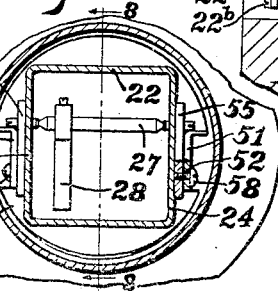
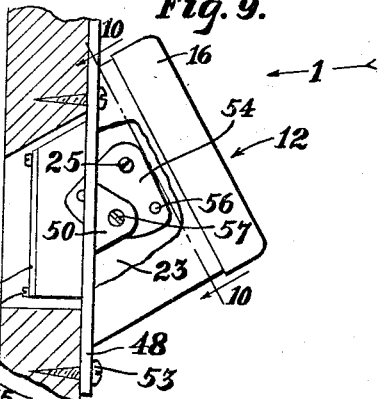
Inventor
Delbert H. Crook
by Hazard & Miller
Att'ys.

UNITED STATES PATENT OFFICE.

DELBERT H. CROOK, OF SAN PEDRO, CALIFORNIA.

GRADE-INDICATOR FOR VEHICLES.

1,251,756.      Specification of Letters Patent.      Patented Jan. 1, 1918.

Application filed July 26, 1917. Serial No. 183,002.

*To all whom it may concern:*

Be it known that I, DELBERT H. CROOK, a citizen of the United States, residing at San Pedro, in the county of Los Angeles and State of California, have invented new and useful Improvements in Grade-Indicators for Vehicles, of which the following is a specification.

My object is to improve and modify the details of construction of a grade indicator for automobiles and especially to provide a grade indicator which may be adjusted to dash-boards of various inclination.

Figure 1 is a front elevation of a grade indicator embodying the principles of my invention, as seen looking in the direction indicated by the arrows —1— in Figs. 2 and 9.

Fig. 2 is a vertical section on a plane parallel with Fig. 9 and on the line 2—2 of Fig. 1.

Fig. 3 is an enlarged fragmentary section of the stabilizer plunger and dash-pot and the means for controlling the dash-pot, on the same plane as Fig. 2.

Fig. 4 is a fragmentary horizontal section on the line 4—4 of Fig. 2 and showing the main shaft of the indicating mechanism.

Fig. 5 is a vertical section on a plane parallel with Fig. 2 and on the line 5—5 of Fig. 1 and upon a reduced scale, and particularly showing the hand operating mechanism.

Fig. 6 is an enlarged sectional detail on the line 6—6 of Fig. 5 and looking in the direction indicated by the arrows.

Fig. 7 is an enlarged sectional detail on the line 7—7 of Fig. 5 showing the counterbalancing spiral spring for stabilizing the indicator hand.

Fig. 8 is a vertical sectional detail on the line 8—8 of Fig. 10 and looking in the direction indicated by the arrow, that is, in the opposite direction from Fig. 5.

Fig. 9 is a side elevation on a plane parallel with Fig. 2 and as indicated by the arrow —9— in Fig. 1, and showing the indicator in position for use, the dash-board being shown in section.

Fig. 10 is a cross-sectional detail on the line 10—10 of Fig. 9.

The dash-board 10 has an opening 11 to receive the indicator 12. The outer casing 13 is cut to fit the indicator after the indicator has been installed and leveled and this casing simply serves as a cover to finish the job.

The circular dial plate 14 is formed integral with an outwardly extending externally screw-threaded flange 15, and an internally screw-threaded bezel 16 fits upon the flange and has an inwardly extending rim to hold the crystal 17 in place against the end of the flange 15. A scale 18 is formed upon the face of the plate 14 concentric with the stem 19 of the indicating hand, said scale reading both ways from the center in horizontal alinement with the stem, and the indicator hand 20 is fixed upon the stem with its point overlapping the scale. The dial plate 14 is fastened by screws 21 to the end of the housing 22, said housing being substantially square in cross-section and having parallel side walls 23 and 24. Cup bearing screws 25 and 26 extend through these walls 23 and 24 and receive the conical ends of the main shaft 27, said shaft being free to rotate in the bearings and extending horizontally transversely of the automobile and parallel with the dash-board. The weighted operating pendulum 28 is fixed upon the shaft 27 just inside of the wall 23 and depends downwardly. A crank arm 29 is fixed upon the center of the shaft 27 by a set-screw 30, said arm extending horizontally forwardly. The dash-pot plunger 31 is pivotally connected to the forward end of the arm 29 and depends vertically and operates in the dash-pot 32. The plunger head has a spheroidal peripheral face fitting closely in the dash-pot so that the stem of the plunger may vibrate without binding. A counterbalancing weight 33 is formed integral with the arm 29 upon the opposite side of the shaft 27 from the dash-pot so as to counterbalance the weight of the plunger. The dash-pot 32 is mounted in a base 34 secured to the horizontal floor 22′ of the housing 22 by screws 35. A vent 36 leads through the base 34 from the bottom of the dash-pot rearwardly and upwardly. The dash-pot regulating stem 37 is mounted through the dial plate 14 and has a reduced screw-threaded end 37′ seated in the base 34 and has a soft metal washer 38 fitting against the shoulder 38′ between the screw-threads and the body of the stem, said washer extending over the vent 36, so that by manipulating the stem the resistance through the vent may be adjusted. The outer end of the stem is provided with a kerf so that it may be manipulated with a screw-driver.

A segmental crown gear 39 is fixed upon the shaft 27 just inside of the wall 24 and held adjustably in place by a set-screw 40. A spiral pinion 41 is fixed upon the hand-stem 19 in mesh with the gear 39. A bearing bracket 42 is secured to the inner face of the wall 24 just inside of the dial plate, and a similar bearing bracket 43 is secured to the wall 24 below and in front of the shaft 27, and the indicator stem 19 is mounted in these bearings and extends through the dial plate. The lower end of the stem 19 is conical and operates in the adjustable cup-screw 44 screw-seated through the bracket 43 and adjustable from the bottom. A spiral spring 45 is fixed at its inner end to the shaft 19 by a clamping collar 46 and its outer end is adjustably mounted in a slot in the pin 47 extending upwardly from the bearing bracket 43 so that the tension of the spring may be accurately adjusted, and the tension of this spring is set so as to turn the indicator hand 20 to its normal central position upon the scale when the automobile is standing level, movement of the hand in either direction being opposed to the tension of the spring.

The housing 22 is square in cross-section at its rear upper end and when the indicator is mounted upon a vertical dash-board, as in Fig. 2, this part of the housing is inclined to an angle of about twenty degrees so that the dial plate 14 will be inclined and easily visible from the operator's seat. The lower part of the housing is made level by the floor 22′ and a plate 22ª fits against the forward end of the housing in a vertical position and is secured in place by cap-screws 22ᵇ so as to complete the closing of the chamber within which the mechanism is operated.

The dash-pot 32 is preferably operated entirely by air. When the plunger goes down the air is compressed and when the plunger goes up the air is expanded, the plunger being set normally in a central position.

The attaching rim 48 is circular in plan and is, or may be stamped from sheet metal, and has a circular opening 49 large enough to receive the housing 22 loosely. Ears 50 and 51 extend backwardly from the inner edge of the rim and have diametrically, horizontally alined bearing openings 52. The rim is adapted to be secured to the face of the dashboard 10 around the opening 11 by screws 53. Triangular plates 54 and 55 are placed against the walls 23 and 24 and the screws 25 and 26, supporting the shaft 27, are screw-seated through these plates. Each of the plates has a series of corresponding tapped openings 56 concentric to the screws 25 and 26. Supporting screws 57 and 58 are inserted through the ears 50 and 51 into desired and corresponding ones of the openings 56, then the device is mounted in place upon the dashboard, with the automobile upon level ground or a level floor, and the housing 22 extends loosely into the opening 11 and is adjusted upon the screws 57 and 58 until the indicator hand 20 assumes its normal position, as shown in Fig. 1. Then the screws 57 and 58 are tightened to hold the indicator mechanism rigidly in place. The points of the screws may jam against the housing. The object of having the series of tapped openings 56 is to provide for adjustment to make the device fit level upon dashboards of various inclinations, and if it cannot be leveled in one opening, the screws are reinserted into another opening and the plates 54 and 55 may be adjusted back and forth upon the walls 23 and 24 around the screws 25 and 26 until the indicator is level with the rig, then the screws 57 and 58 are set up tight in the openings 56. After the indicator has thus been set, the casing 13 is cut to fit the angle between the dashboard 10 and the dial plate 14 and the bezel 16 is removed, the casing slipping over the screw-threaded flange 15 against the attaching rim 48, then the bezel is applied, and has a counter-bore portion 16″ extending beyond the screw-threads and fitting around the edge of the casing so as to hold the casing in place and cover the joint.

The dash-pot 32 and the coil spring 45 serve as stabilizers, so that the indicator hand 20 will not be affected by rough roads and slight unevenness but will be affected by the heavy pendulum weight 28 when the automobile is going up or down a grade of any considerable length, and the scale 18 will accurately show the inclination of the grade.

It is thought that the operation is obvious from the foregoing description and the drawings.

My present invention is an improvement and modification over the invention shown in my companion application for a grade indicator, filed April 10, 1916, Serial No. 90,175, and which patent was granted June 5, 1917, bearing the Number 1,229,041, the leading distinguishing features of the present invention being the means for leveling the grader upon dashboards of various inclinations, and the means for adjusting the dash-pot through the dial plate.

Various changes may be made in the details of construction without departing from the spirit of my invention as set up in the following claims:

I claim:

1. In a grade indicator, a dial plate, a housing extending backwardly from the dial plate, hand operating mechanism in the housing, a dash-pot for steadying the mechanism, and means accessible from in front of the dial plate for regulating the dash-pot.

2. In a grade indicator, a dial plate, a housing extending backwardly from the dial plate, hand operating mechanism in the housing, a dash-pot in the housing for steadying the hand operating mechanism; there being a rearwardly extending vent in the dash-pot; a stem inserted through the dial plate for regulating the vent, a bezel screw-seated upon the dial plate, and a crystal held in place by the bezel; so that by removing the bezel the dash-pot may be regulated.

3. In a grade indicator, an attaching plate having an opening, a housing loosely mounted in the opening and pivotally connected to the attaching plate on a horizontal plane, a grade indicator mechanism mounted in the housing, and means for holding the housing in an adjusted position upon the pivotal connection.

4. In a grade indicator, an attaching plate adapted to be secured to a dash-board and having a large central opening, a housing extending loosely into the opening and pivotally connected to the attaching plate, means for adjusting the housing to a level position, means for holding the housing in its adjusted level position, and grade indicator mechanism mounted in the housing.

5. In a grade indicator, an attaching plate having a large opening, bearings extending from the attaching plate at opposite sides of the opening and in horizontal alinement, a housing, grade indicator mechanism mounted in the housing; said housing having vertical flat sides and fitting loosely in said opening; plates mounted against the flat sides of the housing and secured upon pivots in alinement with the main shaft of the indicator mechanism; said plates having a series of tapped openings concentric to the pivots; and screws adapted to be inserted through the bearings into desired ones of the tapped openings so as to level the grade indicator mechanism relative to the attaching plate.

In testimony whereof I have signed my name to this specification.

DELBERT H. CROOK.

Copies of this patent may be obtained for five cents each, by addressing the "Commissioner of Patents, Washington, D. C."